Patented Jan. 26, 1943

2,309,598

UNITED STATES PATENT OFFICE 2,309,598

PROCESS FOR THE PREPARATION OF 6-HYDROXY CHROMANES

Paul Karrer, Zurich, and Otto Isler, Basel, Switzerland, assignors to Hoffmann-La Roche Inc., Nutley, N. J., a corporation of New Jersey No Drawing. Application August 3, 1940, Serial No. 351,167. In Switzerland July 28, 1939

6 Claims. (Cl. 260—333)

It is known that alkylated 2-dialkyl-6-hydroxy chromanes can be prepared by the condensation of β-dialkylallyl alcohols or halides with alkylated hydroquinones containing at least one hydrogen atom in the benzene ring (cf. Helvetica Chimica Acta, vol. 21, year 1938, page 520; Nature, vol. 142, year 1938, page 36; Helvetica Chimica Acta, vol. 22, year 1939, page 337).

It has now been found that dialkyl ethinyl carbinols or their halides can be condensed with alkylated hydroquinones having at least one free position in the benzene ring, preferably by means of acid condensing agents to bicyclic condensation products of the structure of 2-dialkyl-6-hydroxy chromenes (3,4). These condensation products readily take up one mol of hydrogen in presence of a suitable catalyst, such as palladium on charcoal or calcium carbonate, or platinum oxide. The hydrogenated products correspond in their properties to 2-dialkyl-6-hydroxy chromanes.

The condensation probably occurs according to the following scheme:

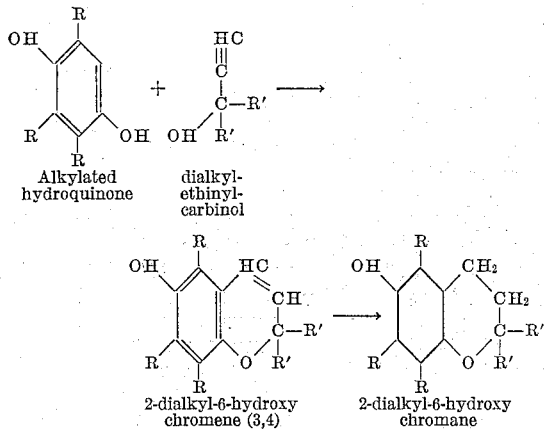

R represents hydrogen or alkyl, R' represents alkyl.

The hitherto unknown condensation of dialkyl ethinyl carbinols with alkylated hydroquinones having at least one hydrogen atom in the benzene ring provides a ready means of preparing a new class of compounds, i. e. the 2-dialkyl-6-hydroxy chromenes (3,4). The hydrogenation of these condensation products provides a new process for the preparation of 6-hydroxy chromanes. If the reaction products are trimethylhydroquinone and 2,6,10-trimethyl-14-ethinyl-pentadecanol(14) the chromene produced has an antiabortive action on the vitamin-E-free rat of the same order as that of dl-α-tocopherol. Subsequent hydrogenation of this chromene produces dl-α-tocopherol (vitamin E).

The dialkyl-6-hydroxy chromanes are crystalline compounds or almost colourless viscous oils. They reduce ammoniacal silver nitrate solution at once and neutral methyl alcoholic silver nitrate solution on warming. By potentiometric titration with gold chloride (Helvetica Chimica Acta, vol. 21, year 1939, page 939) an amount of oxidising agent corresponding to 2 atoms of hydrogen is used up.

Example 1

3 parts by weight of trimethylhydroquinone, 2 parts by weight of anhydrous zinc chloride and 10 parts by weight of decahydronaphthaline are heated in a stream of carbon dioxide to 150° C. with stirring. 6 parts by weight of 2,6,10-trimethyl-14-ethinyl-pentadecanol(14) (prepared according to Fischer and Löwenberg, Annalen der Chemie, vol. 475, year 1929, page 195) are added and the mixture kept at 150° C. for 2 hours. After cooling, water and petroleum ether (boiling point 50–70° C.) are added and the petroleum ether solution washed with n-sodium hydroxide, n-hydrochloric acid and water and dried with sodium sulfate. The solution is then adsorbed on an aluminium oxide column and the chromatogram developed with much petroleum ether. The column consists of 3 zones: a thin brown upper layer, a grey main zone, and a yellow ring. The grey main zone is eluted with a mixture of methyl alcohol and ether (3:1) and the solvent evaporated. The extract is a brown oil, very sensitive to oxidation which reduces neutral methyl alcoholic silver nitrate solution and forms a sublimate of durohydroquinone on thermal decomposition.

This chromene compound has an antiabortive action on the vitamin-E-free rat of the same order as that of dl-α-tocopherol. The acetyl derivative is a stable oil.

This extract of the grey main zone is dissolved in 10 parts by weight of ethyl acetate and shaken at room temperature with hydrogen in the presence of palladium charcoal catalyst, one mol of hydrogen being taken up. The catalyst is then filtered off, the ethyl acetate evaporated, the hydrogenated condensation product dissolved in petroleum ether of boiling point 50–70° C. and filtered through a short magnesium sulfate column. The filtrate is then adsorbed on an aluminum oxide column and the chromatogram developed with much petroleum ether (boiling point 50–70° C.). The almost colourless main zone in the upper part of the column is eluted with a mixture of methyl alcohol and ether (3:1) and the solvent evaporated. The extract is a yellow oil $n^{20}_D = 1.506$ which is identical with dl-α-tocopherol (Helvetica Chimica Acta, vol. 21, year 1938, page 520). 5 milligrams of the compound are biologically active on the rat kept on a vitamin-E-free diet.

*Example 2*

4 parts by weight of 2,6-dimethyl-10-ethinyl-undecanol(10) (prepared according to Fischer and Löwenberg, Annalen der Chemie, vol. 475, year 1929, page 189), 3 parts by weight of trimethylhydroquinone, 2 parts by weight of anhydrous zinc chloride and 10 parts by weight of decahydronaphthaline are heated with stirring in a stream of carbon dioxide for 3 hours to 150° C. After cooling, water and petroleum ether (boiling point 50–70° C.) are added and the petroleum ether solution washed with n-sodium hydroxide, n-hydrochloric acid and water, dried with sodium sulfate and the solution evaporated. The residue is taken up in methyl alcohol and shaken at room temperature without pressure with hydrogen in presence of palladium charcoal catalyst. Thereupon the catalyst is filtered and the methyl alcohol evaporated. The hydrogenation product is dissolved in petroleum ether (boiling point 50–70° C.) and adsorbed on an aluminum oxide column and the chromatogram developed with a large volume of petroleum ether. The grey main zone is eluted with a mixture of methyl alcohol and ether (3:1). After evaporation of the solvent the extract is purified by molecular distillation. The middle fraction is a yellow oil, $n^{20}_D = 1.515$, which is identical with 2,5,7,8-tetramethyl-2(4′-8′-dimethylnonyl)-6-hydroxy chromane (Helvetica Chimica Acta, vol. 21, year 1938, page 1623).

*Example 3*

3 parts by weight of trimethylhydroquinone, 2 parts by weight of anhydrous zinc chloride and 10 parts by weight of decahydronaphthaline are stirred and heated in carbon dioxide to 150° C. 2 parts by weight of methyl butinol

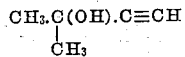

(prepared by the condensation of acetone sodium and acetylene) are added and the mixture stirred 3 hours at 150° C. The condensation product is taken up in a large volume of petroleum ether (boiling point 50–70° C.). The solution is washed with n/10 sodium hydroxide, n-hydrochloric acid and water, dried with sodium sulfate and adsorbed on an aluminium oxide column. The grey main zone is eluted with a mixture of methyl alcohol and ether (3:1), the solvent is evaporated and the residue hydrogenated in methyl alcoholic solution in presence of palladium calcium carbonate catalyst. After removal of the catalyst and solvent, the hydrogenation product is taken up in much petroleum ether and filtered through a column of dry magnesium sulfate. On concentration of the filtrate 2,2,5,7,8-pentamethyl-6-hydroxy chromane crystallises in plates (melting point 93° C.).

*Example 4*

10 parts by weight of 2,6,10-trimethyl-14-ethinyl-pentadecanol(14)

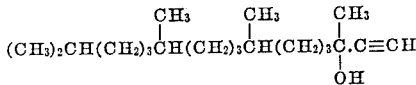

are dissolved in 20 parts by weight of petroleum ether. The solution is cooled to −15° C. and treated with 10 parts by weight of phosphorus tribromide in 10 parts by weight of absolute petroleum ether drop by drop with stirring. At the same time a stream of $CO_2$ is passed through the reaction vessel and the temperature of the solution kept below −5° C. The mixture is then kept for 12 hours at room temperature, poured on to ice and extracted with ether. The ether extract is washed with n-sodium hydroxide, n-hydrochloric acid and water. Any emulsion formed can be resolved by addition of methyl alcohol. After drying the extract with sodium sulfate the solvent is evaporated and the bromide

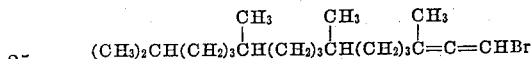

obtained as an almost colourless oil.

7.5 parts by weight of this bromide are warmed on a water-bath under reflux with 1.7 parts by weight of trimethylhydroquinone and 2 parts by weight of anhydrous zinc chloride in 50 parts by weight of dry petroleum ether (boiling point 60–80° C.) for one hour. (The condensation also takes place in absence of condensing agents.) After one hour, when the intensive evolution of hydrogen bromide has abated, the mixture is poured on ice, extracted with ether, the ether solution dried and the solvent evaporated.

The residue is adsorbed from petroleum ether solution on aluminium oxide. The eluate of the middle layers of the chromatogram give on formation of the allophanate (by saturation of the benzene solution with cyanic acid) dl-3,4-dehydro-α-tocopherol allophanate, which can be crystallised from alcohol and acetone. (Melting point 163° C.)

By hydrolising the allophanate with n-alcoholic caustic potash solution for one hour, the free dl-3,4-dehydro-α-tocopherol is obtained as a viscous oil. By hydrogenation in presence of palladium charcoal catalyst dl-α-tocopherol is obtained therefrom.

We claim:
1. A 2-dialkyl-6-hydroxy-chromene-(3,4) which is alkylated in the benzene ring.
2. The 2,5,7,8 - tetramethyl - 2 (4′, 8′, 12′- trimethyl-tridecyl)-6-hydroxy chromene(3,4).
3. A process for the preparation of an alkylated 2-dialkyl-6-hydroxy chromane which comprises reacting an alkylated hydroquinone having at least one free position in the benzene ring with a material selected from the group consisting of dialkyl ethinyl carbinols of the formula

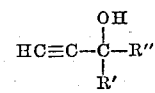

in which R′ and R″ represent alkyl radicals, and the halides obtained therefrom, and hydrogenating the alkylated 2-dialkyl-6-hydroxy chromene (3,4) thus formed to produce the corresponding chromane.
4. A process for the preparation of an alkylated 2-dialkyl-6-hydroxy chromane which comprises reacting an alkylated hydroquinone having at least one free position in the benzene ring with a material selected from the group consisting of dialkyl ethinyl carbinols of the formula

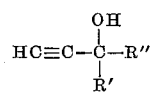

in which R' and R'' represent alkyl radicals, and the halides obtained therefrom in the presence of an acid condensing agent, and hydrogenating the alkylated 2-dialkyl-6-hydroxy chromene (3,4) thus formed to produce the corresponding chromane.

5. A process for the manufacture of a tocopherol which comprises reacting 2,6,10-trimethyl-14-ethinyl-pentadecanol(14) with trimethyl-hydroquinone in the presence of an acid condensing agent and hydrogenating the 2,5,7,8-tetramethyl-2(4',8',12'-trimethyl-tridecyl)-6-hydroxy chromene(3,4) thus formed to produce a tocopherol.

6. A process for the manufacture of a tocopherol which comprises reacting 2,6,10-trimethyl-14-ethinyl-penta-decanol(14) with trimethyl-hydroquinone and hydrogenating the 2,5,7,8-tetramethyl-2(4',8',12'-trimethyl-tridecyl)-6-hydroxy chromene(3,4) thus formed to produce a tocopherol.

PAUL KARRER.
OTTO ISLER.